United States Patent
Lee et al.

(10) Patent No.: US 9,512,014 B2
(45) Date of Patent: Dec. 6, 2016

(54) WATER TREATING EQUIPMENT PROVIDING COALESCENCE AND FLOTATION WITHIN A SINGLE VESSEL

(71) Applicant: Cameron Solutions, Inc., Houston, TX (US)

(72) Inventors: Joseph Min-Hsiun Lee, Houston, TX (US); Gary W. Sams, Spring, TX (US); Z. Frank Zheng, Cypress, TX (US)

(73) Assignee: Cameron Solutions, Inc., Houston, TX (US)

( * ) Notice: Subject to any disclaimer, the term of this patent is extended or adjusted under 35 U.S.C. 154(b) by 0 days.

(21) Appl. No.: 14/452,935

(22) Filed: Aug. 6, 2014

(65) Prior Publication Data

US 2016/0039684 A1    Feb. 11, 2016

(51) Int. Cl.
*C02F 1/40* (2006.01)
*B01D 17/02* (2006.01)
(Continued)

(52) U.S. Cl.
CPC ............. *C02F 1/40* (2013.01); *B01D 17/0205* (2013.01); *B01D 17/045* (2013.01); *C02F 1/24* (2013.01);
(Continued)

(58) Field of Classification Search
CPC .............. C02F 1/40; C02F 1/00; C02F 1/24; C02F 2101/32; C02F 2101/30; C02F 2103/10; C02F 2103/008; B01D 17/0205; B01D 17/02; B01D 17/00; B01D 17/045; B01D 17/04; B01D 21/26–21/267; B01D 17/0211; B01D 17/0208; B01D 17/0214; B01D 17/208; B01D 21/2416; B01D 21/2405; B01D 21/24; B01D 21/00; B03D 1/1456; B03D 1/1443; B03D 1/14; B03D 1/1412; B63B 35/32; B63B 35/24; B63B 35/14; B63B 35/1468; B63B 35/1443; B63B 35/1493; B63B 35/1431
(Continued)

(56) References Cited

U.S. PATENT DOCUMENTS 4,304,671 A    12/1981   Labaquere
4,437,986 A *  3/1984    Hutchins et al. ............. 210/130
(Continued)

FOREIGN PATENT DOCUMENTS

NL    7907303 A    4/1980

*Primary Examiner* — David C Mellon
*Assistant Examiner* — Liam Royce
(74) *Attorney, Agent, or Firm* — Gable Gotwals (57) ABSTRACT

A vessel for treating an oil-in-water inlet stream houses an inlet flow distributor arranged to direct an inlet flow toward a perforated baffle of a coalescing section, the coalescing section housing a packing and being arranged upstream of a second baffle; a flotation section arranged to receive a flow exiting the coalescing section and being divided by one or more perforated baffles; and an outlet water collecting pipe arranged to receive a flow exiting the flotation section, the outlet water collecting pipe having one or more openings located along its length. The coalescing section may be divided into two sections, with one section preferably housing a different pre-selected sized packing than the other section. The flotation section may include one or more gas-inducing devices. A solid baffle may be arranged downstream of the second baffle and ahead of the flotation section to provide single or dual flow through that section.

22 Claims, 11 Drawing Sheets (51) Int. Cl.
*C02F 1/24* (2006.01)
*B01D 17/04* (2006.01)
*C02F 103/10* (2006.01)
*C02F 101/32* (2006.01)
*C02F 1/00* (2006.01)

(52) U.S. Cl.
CPC ............ *C02F 1/006* (2013.01); *C02F 2101/32* (2013.01); *C02F 2103/10* (2013.01); *C02F 2301/02* (2013.01)

(58) Field of Classification Search
USPC ............... 210/799, 767, 781, 780, 787, 804, 800, 210/806, 703, 702, 708, 151, 150, 305, 299, 210/295, 294
See application file for complete search history.

(56) References Cited

U.S. PATENT DOCUMENTS

| | | | |
|---|---|---|---|
| 4,936,990 A * | 6/1990 | Brunsell et al. | 210/331 |
| 5,028,333 A * | 7/1991 | Wright et al. | 210/521 |
| 5,229,015 A * | 7/1993 | Keep et al. | 210/799 |
| 5,298,167 A * | 3/1994 | Arnold | B01D 17/0208 210/703 |
| 5,443,724 A | 8/1995 | Williamson et al. | |
| 5,656,173 A | 8/1997 | Jordan et al. | |
| 6,074,557 A * | 6/2000 | Lyles, Sr. | B01D 17/0205 210/112 |
| 6,149,408 A * | 11/2000 | Holt | 418/1 |
| 6,214,220 B1 * | 4/2001 | Favret, Jr. | B01D 17/00 210/188 |
| 2004/0256325 A1 | 12/2004 | Frankiewicz et al. | |
| 2009/0194472 A1 * | 8/2009 | Jack et al. | 210/170.05 |
| 2011/0297620 A1 * | 12/2011 | Lee et al. | 210/703 |

* cited by examiner

WATER TREATING EQUIPMENT PROVIDING COALESCENCE AND FLOTATION WITHIN A SINGLE VESSEL

BACKGROUND OF THE INVENTION

This invention relates to systems and apparatuses designed for water treatment. More specifically, the invention relates to water treating equipment in which coalescence and flotation can occur within a single treatment vessel.

Selection of water treating equipment is typically based on inlet conditions, outlet specifications required, and operating conditions such as temperature and chemical used for the treatment. Inlet conditions include oil droplet size and concentration; inlet fluid physical and chemical properties such as API gravity of oil and salinity of produced water; and the type of chemical and dosage used for the treatment.

Outlet specifications required depend on whether onshore or offshore discharge or reinjection is involved. For offshore discharge, the outlet specification, which can vary by location and country, is typically about 29 ppm of oil-in-water for the Gulf of Mexico. For reinjection, the outlet specification can depend on such factors as the type of reservoir involved (e.g. a tight formation or not). Typically, the outlet oil and solid specifications are less than 5 ppm.

For an offshore discharge application to meet the 29 ppm specification, a liquid/liquid hydrocyclone unit followed by a flotation unit is the preferred process flow scheme. The hydrocyclone unit is typically compact to reduce space and weight requirements.

For an onshore discharge or reinjection application to meet the less than 5 ppm specification, a skimmer followed by a corrugated plate interceptor ("CPI") followed by flotation unit and nutshell filter unit is the preferred process flow scheme. Because the largest CPI can only process up 60,000 barrels/day of fluid, a large throughput facility (e.g., greater than 240,000 barrels/day) would require at least four trains to process that throughput.

SUMMARY OF THE INVENTION

A vessel or cross-flow scrubber made according to this invention, and a method for its use, can handle a throughput of at least 60,000 barrels/day and up to 240,000 barrels/day or more in single vessel and still meet less than a 5 ppm specification when used in combination with a nutshell filter located downstream, thereby making the system more compact when compared to the use of corrugated plate inceptors ("CPIs) and reducing construction costs relative to CPI trains. The scrubber's inlet distributor, coalescing section, flotation section, internal baffle design, outlet water collection pipe all work in combination to reduce the cost of construction and increase performance by at least 50% for a given level of throughput relative to vessels which contain either coalescence or flotation and CPI trains. The flow rate through the vessel can be a range of 1 ft/min to 10 ft/min (0.3048 m/min to 3.048 m/min) and is preferably in a range of 2 ft/min to 5 ft/min (0.6096 m/min to 1.524 m/min).

In one preferred embodiment, the vessel extends in a longitudinal direction and houses:

an inlet flow distributor arranged to direct an inlet flow toward a perforated baffle located ahead of a coalescing section, the coalescing section housing a packing and being arranged upstream of a second perforated baffle which, optionally, can be followed by a solid baffle;

a flotation section arranged to receive a flow exiting the coalescing section, the flotation section being divided by one or more perforated baffles and which may include one or more gas-inducing devices; and an outlet water collecting pipe arranged to receive a flow exiting the flotation section, the outlet water collecting pipe having one or more openings located along its length.

The coalescing section may be divided into a first and a second section, with the packing of the first section being a different pre-selected packing than the packing of the second section. The packing in each section preferably differ according to size but could also differ according to shape and material. Preferable shapes include coalescing balls and coalescing rings. The coalescing section may also include a solids removal device which creates a cyclonic flow about the solids removal device and fluidizes the solids which have settled to the bottom of that section.

The perforated baffle and second perforated baffle located respectively ahead and behind the coalescing section distribute flow uniformly across (or through) the vessel. The optional solid baffle can be arranged to provide single direction flow or dual direction flow through the flotation section. Perforated baffles in the flotation section divide the section into cells and distribute flow uniformly across or through that section.

The inlet flow distributor may include a pipe which first directs the incoming flow away from the perforated baffle located immediately ahead of the coalescing section and then a half-pipe arranged to redirect the incoming flow toward the perforated baffle of the coalescing section.

A method of treating an oil-in-water stream includes the steps of routing the oil-in-water stream to a vessel as described above.

Objectives of this invention include providing a vessel which (1) performs coalescence and flotation in a single vessel; (2) handles volumes of at least 60,000 barrels per day; (3) accommodates a large volume of water-to-be-treated at any given time relative to the overall interior volume of the vessel; (4) reduces the footprint and construction costs of the water treating portion of a production system; and (5) allows existing vessels to be retrofitted.

ELEMENTS AND NUMBERING USED IN THE DRAWINGS

10 Vessel or cross-flow scrubber
11 Inlet side
13 Outlet side
15 Top end
17 Bottom end
19 Inlet pipe
21 Inlet flow distributor
23 Longitudinally extending pipe with holes toward inlet side
25 Shrouded (half) pipe facing holes of 23
30 Coalescing section
31 Perforated baffle
33 Coalescing ball (packing)
35 Coalescing ring (packing)
37 First section
39 Second section
41 Solids removal device
43 Solid baffle on outlet side of 30
45 Inlet side of 30
47 Outlet side of 30
50 Flotation section
51 Oil skimmer
53 Radial eductor (gas-inducing device)
55 Perforated baffle
57 Cell
61 Outlet water collecting pipe
63 Treated water outlet pipe

DETAILED DESCRIPTION OF THE PREFERRED EMBODIMENTS

A water treating apparatus made according to this invention houses a coalescing section and a flotation section within a single vessel. The vessel, or cross-flow scrubber, is more compact than prior art corrugated plate interceptors ("CPIs") and, because of its improved performance, can replace multiple CPIs. For example, a 12-foot diameter by 60-foot long (3.6576 m by 18.288 m) vessel can replace at least four large CPIs and still achieve the same daily throughput as those four CPIs.

Because the vessel can replace multiple CPIs, the number of inlet and outlet valves and piping is reduced along with construction costs. The combination of a coalescing section and flotation section in one vessel also improves overall performance when compared to vessels with only a coalescing section or a flotation section. This leads to a more cost effective solution for treating produced water to meet discharge requirements.

In a preferred embodiment the vessel, which is elongated in the horizontal longitudinal direction, houses an inlet flow distributor connected to an inlet of the vessel and extending left and right of the inlet in the horizontal longitudinal direction of the vessel; a coalescing section located downstream of the inlet flow distributor in a horizontal lateral direction between a perforated baffle and a second baffle and extending about a same length as the inlet distributor in the horizontal longitudinal direction of the vessel; a gas flotation section located downstream of the second baffle in the horizontal lateral direction of the vessel and extending about the same length as the coalescing section in the horizontal longitudinal direction of the vessel; and an outlet water collecting pipe arranged to receive a flow exiting the gas flotation section, the outlet water collecting pipe having one or more openings located along its length. The inlet flow distributor is arranged to direct an inlet flow to the vessel in the horizontal lateral direction across the vessel, the inlet flow within the vessel remaining a horizontal flow through the coalescing and gas flotation sections. A method of using the vessel includes the step of flowing the inlet oil-in-water stream horizontally through a vessel between the inlet flow distributor and the outlet water collecting pipe Referring first to FIGS. 1A & 1B, a longitudinal vessel 10 includes a coalescing section 30 located toward the inlet side 11 of the vessel 10 and a flotation section 50 located toward the outlet side 13 of the vessel 10. The coalescing section 30 coalesces the incoming small oil droplets to larger oil droplets and helps the resulting larger oil droplets float to an oil skimmer 51 located toward the top end 15 of the vessel 10. The skimmer 51 is preferably arranged as a trough extending in the longitudinal direction of the vessel 10. The flotation section 50 makes use of radial eductors 53 (see e.g. FIGS. 1A-B & 2A-C), located toward the bottom end 17 of the vessel, which generate small gas bubbles that move vertically upward through the horizontal flow and attach to the oil droplets and further float the remaining smaller oil droplets to the oil skimmer 51.

Figure 3:
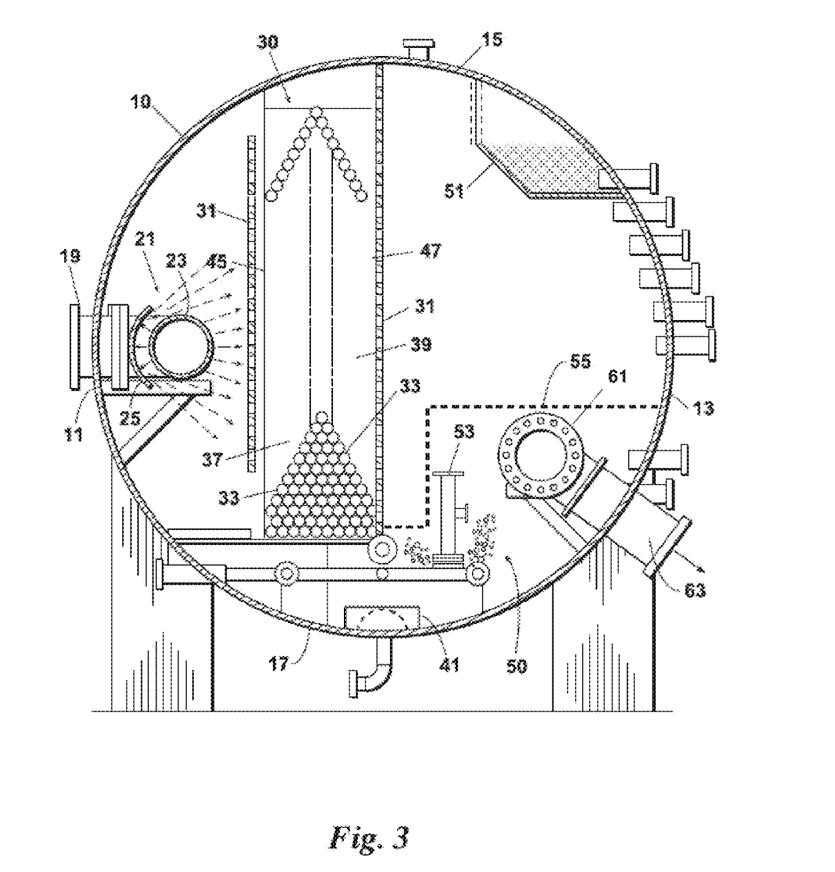
FIG. 3 is a cross-section front view of the cross-flow scrubber of FIG. 1 illustrating the distribution pattern of the inlet distributor to the coalescing section of the scrubber.
Figure 5A:
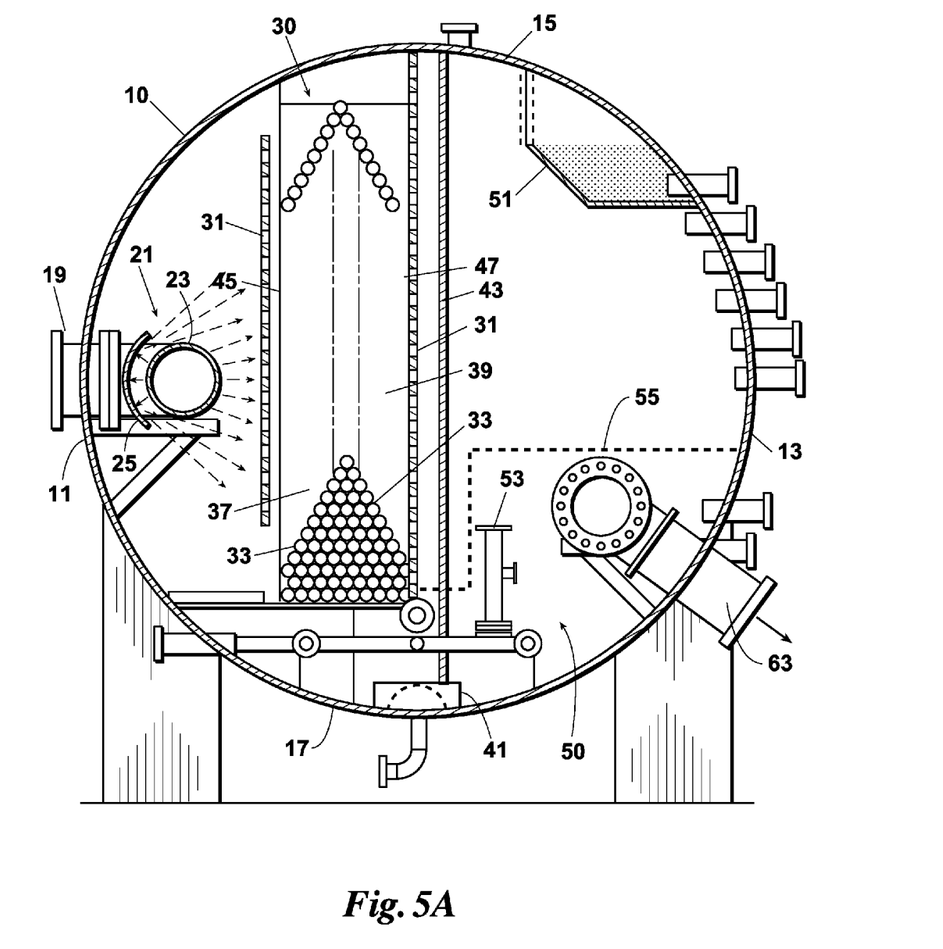
FIG. 5A is cross-section front view of an alternate preferred embodiment of the cross flow scrubber having a solid baffle located between the coalescing and flotation sections of the scrubber.
Figure 6:
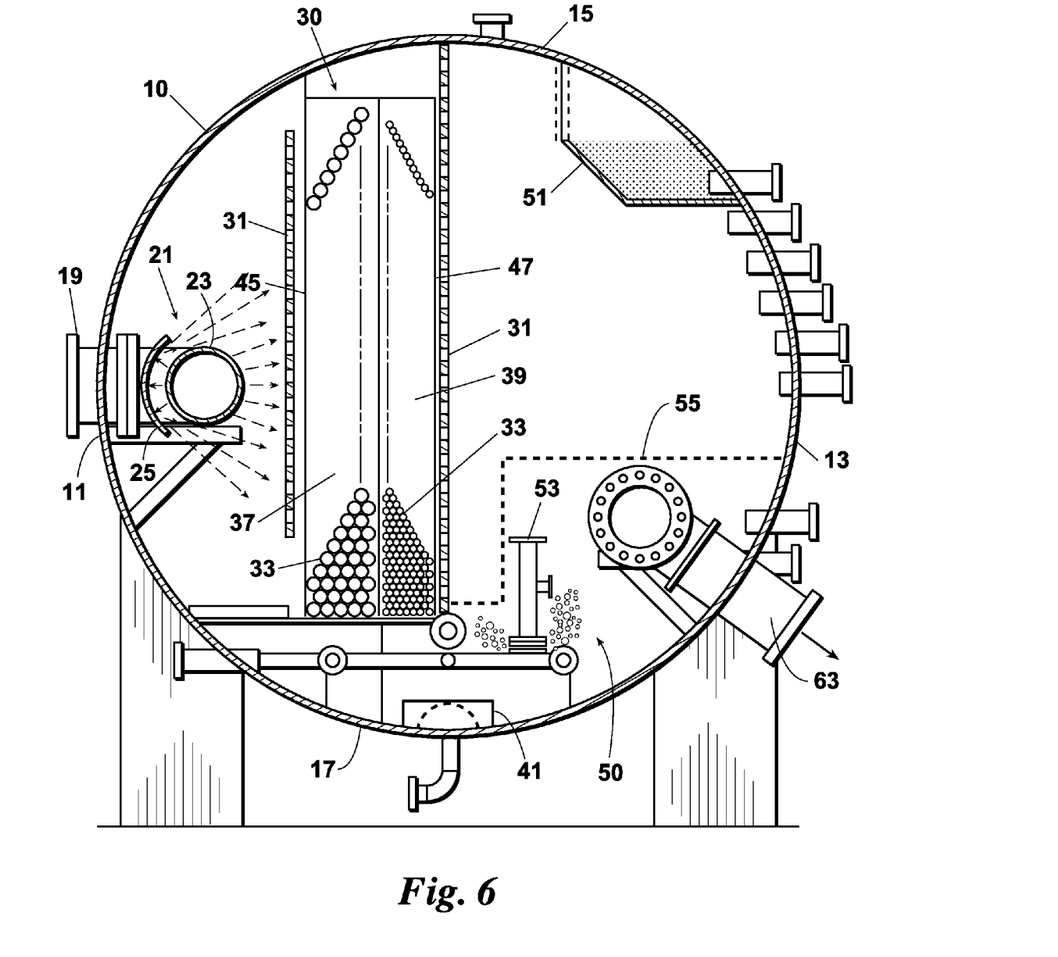
FIG. 6 is an alternate preferred embodiment of the coalescing section with one part of the coalescing section having a different sized packing or coalescing ball than the other.

The incoming oil-in-water stream enters in inlet pipe 19 and is distributed to the coalescing section 30 by way of an inlet flow distributor 21 having a longitudinal pipe 23 with holes on one side only that directs the incoming stream toward a shrouded (half) pipe 25 which, in turn, redirects the stream in an even flow to the coalescing section 30 (see FIGS. 3, 5A, and 6). A HIFLO® spreader (Cameron Process Systems, Houston TX) or its equivalent is a suitable and preferred inlet flow distributor 21.

Figure 4:
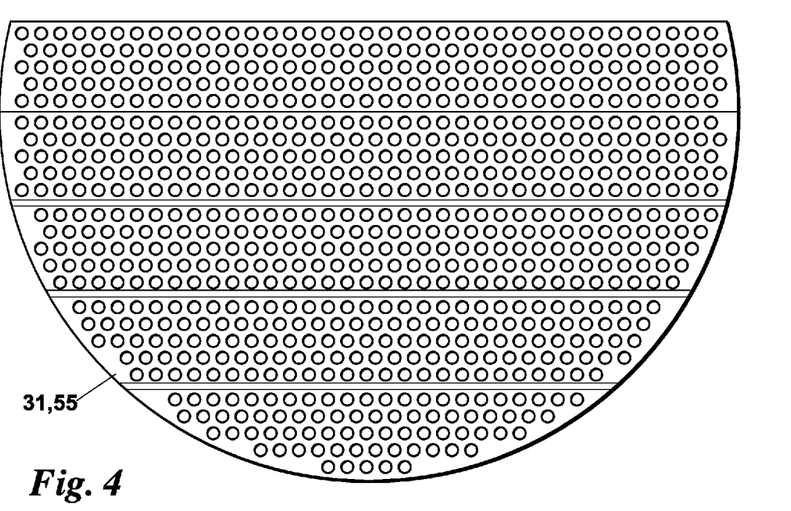
FIG. 4 is a front view of a perforated baffle used in the scrubber of FIG. 3.
Figure 5B:
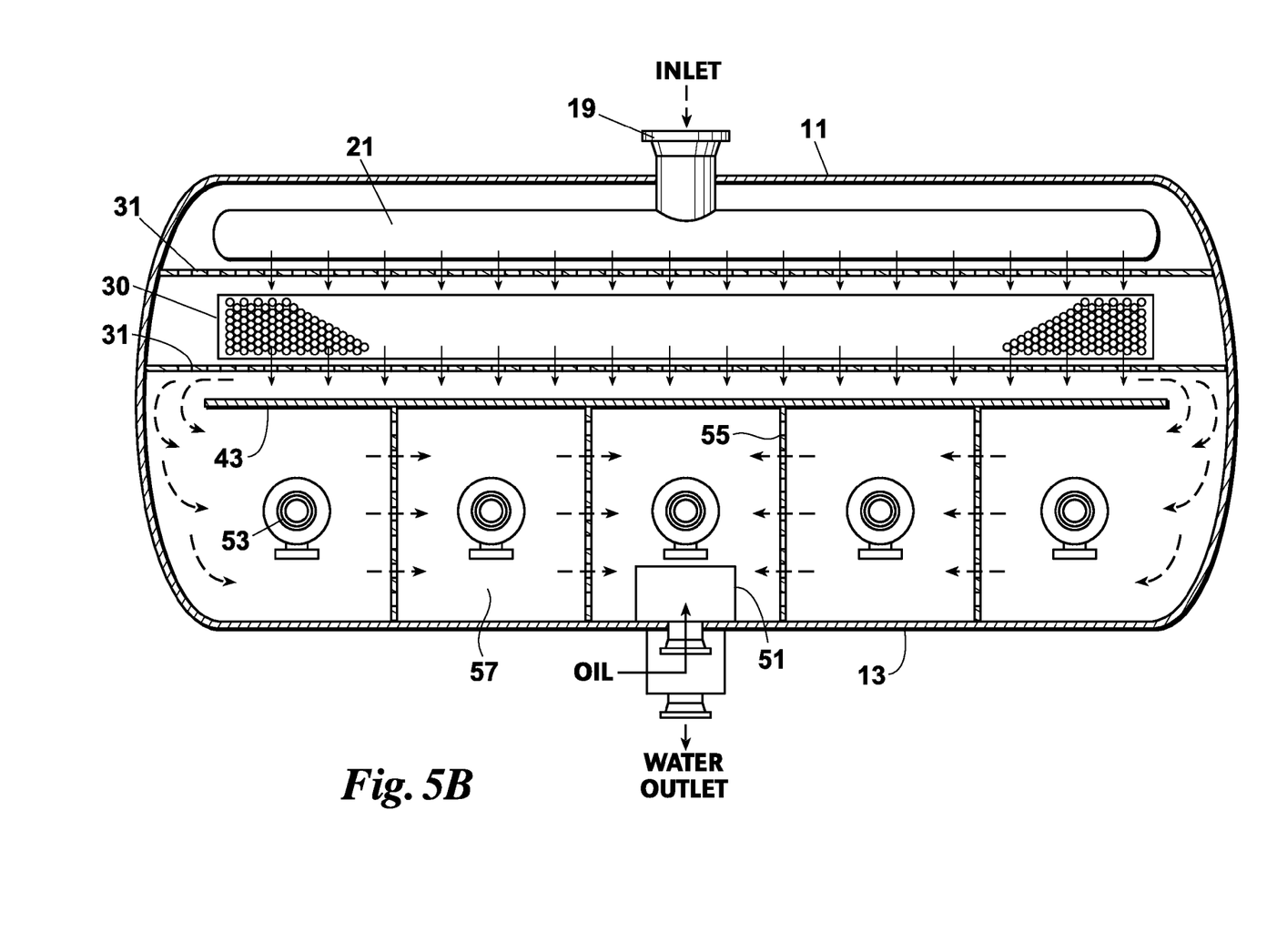
FIG. 5B is a top view of a scrubber having a solid baffle after the coalescing section with the solid baffle arranged to provide dual flow through the flotation section.
Figure 5C:
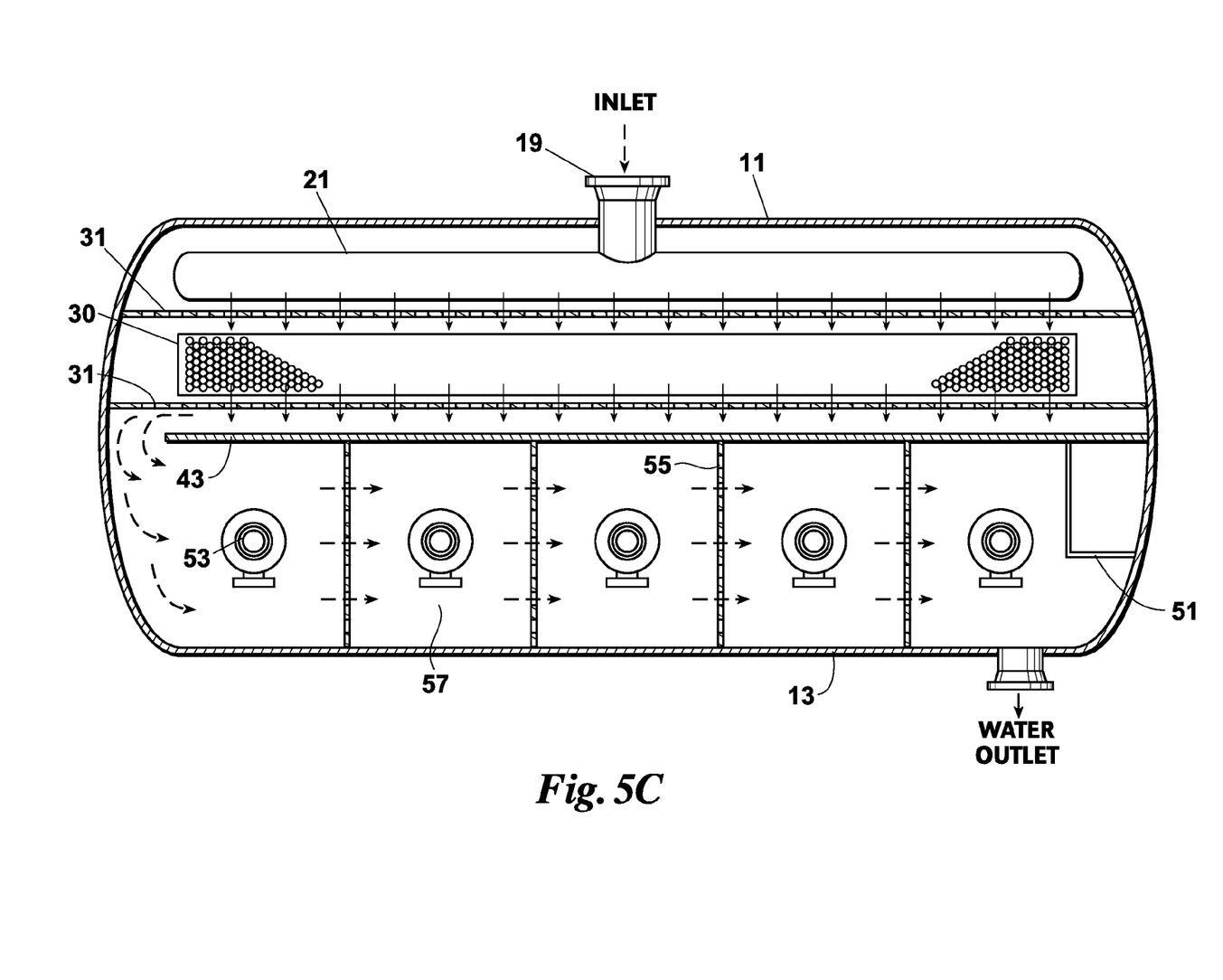
FIG. 5C is a is a top view of a scrubber having a solid baffle after the coalescing section with the solid baffle arranged to provide single flow through the flotation section.

Perforated baffles 31 (see e.g. FIG. 4) are located immediately ahead of the inlet side 45 and immediately after the outlet side 47 of the coalescing section 30 to prevent fluid short circuiting and to improve volumetric utilization of the vessel 10. Preferably, the cross-sectional area per each hole and number of holes in the baffles 31 are designed to have a pressure drop in a range of 0.8 to 1.0 inch (2.032 to 2.54 cm) water column. The baffles 31, which span the length of vessel 10, distribute flow evenly or uniformly through the vessel 10. The perforated baffle 31 on the outlet side 47 may have a solid baffle 43 located after it which can be arranged for single or dual directional flow through the flotation section 50 (see FIGS. 5A-C).

Figure 1A:
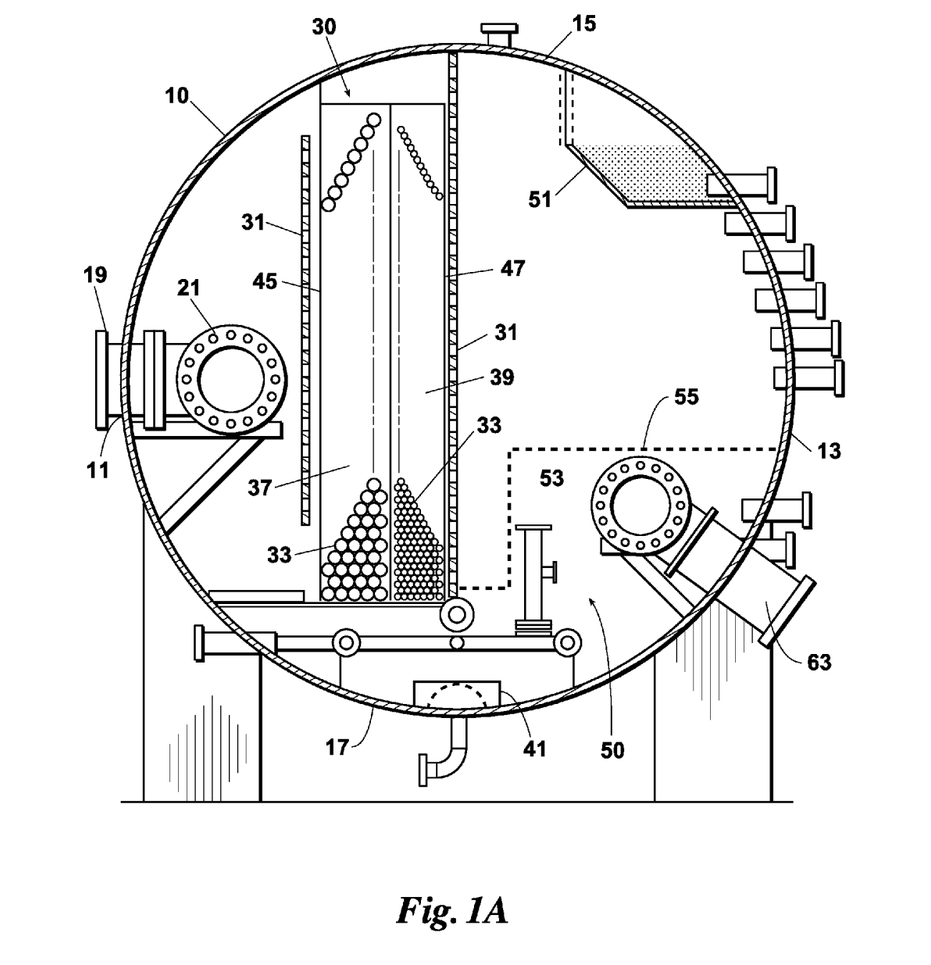
FIG. 1A is a cross-section front view of a preferred embodiment of a treatment vessel or cross-flow scrubber made according to this invention. The scrubber includes a coalescing section and flotation section along with a specially designed inlet flow distributor, internal baffle design, and outlet water collection pipe.
Figure 1B:
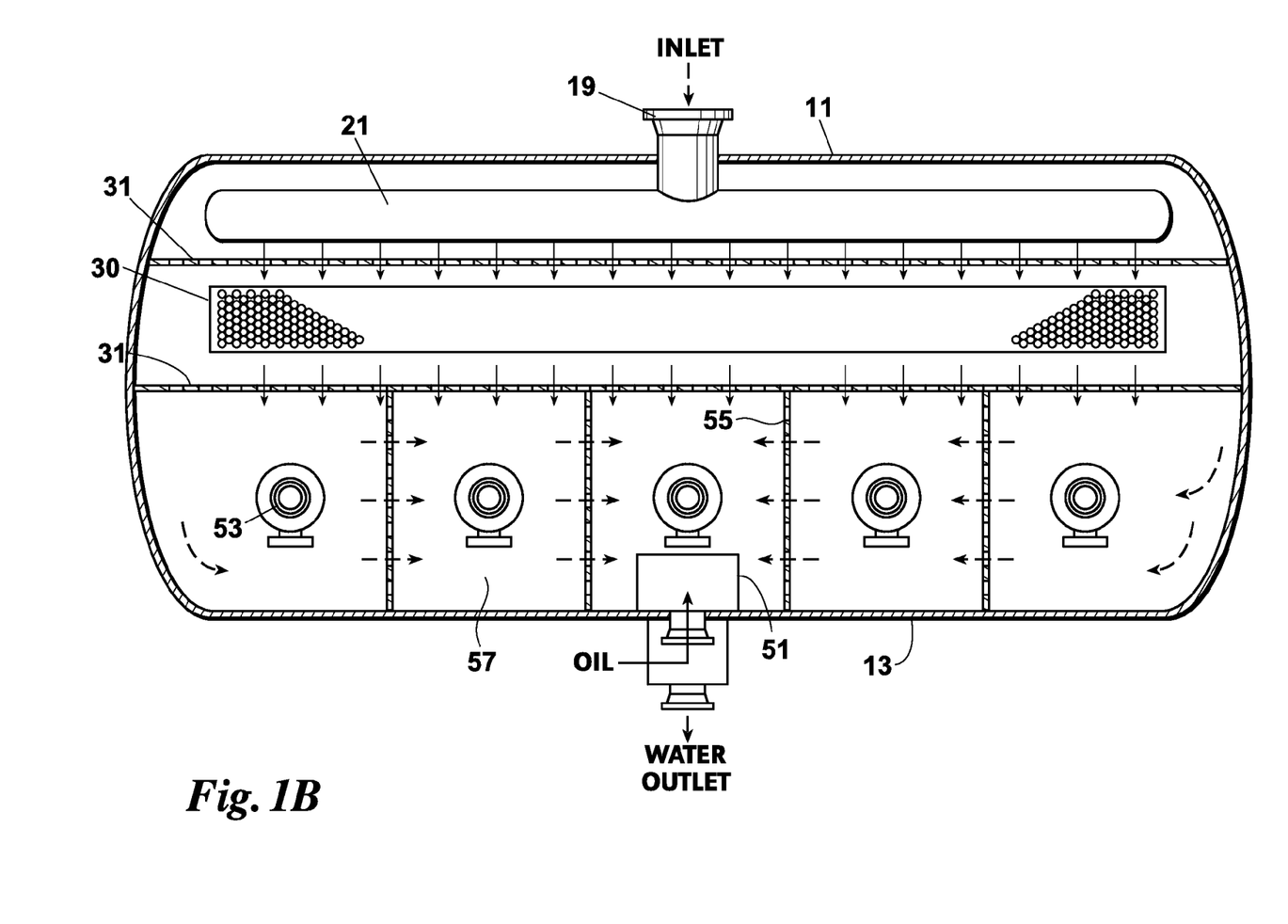
FIG. 1B is top view of the scrubber of FIG. 1A.
Figure 2A:
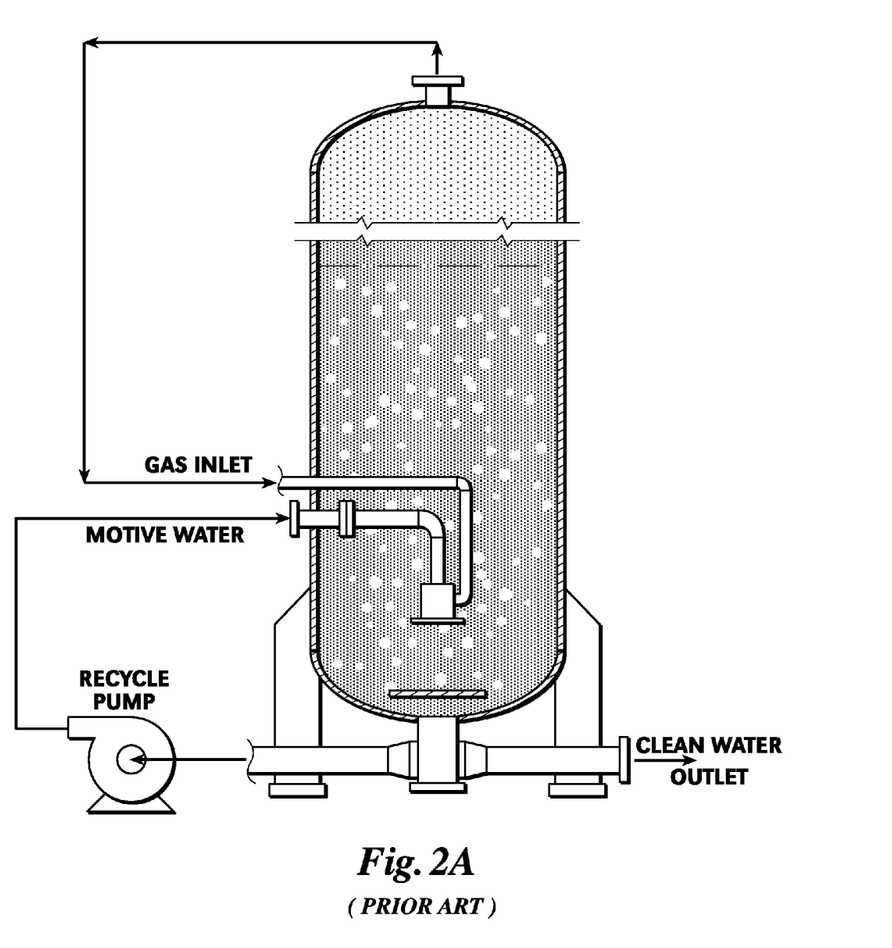
FIG. 2A is a cross-section view of a prior art vessel illustrating a typical radial eductor installation. This type of radial eductor is used as a preferred embodiment of the gas-inducing device in the flotation section of the cross-flow scrubber.
Figure 2B:
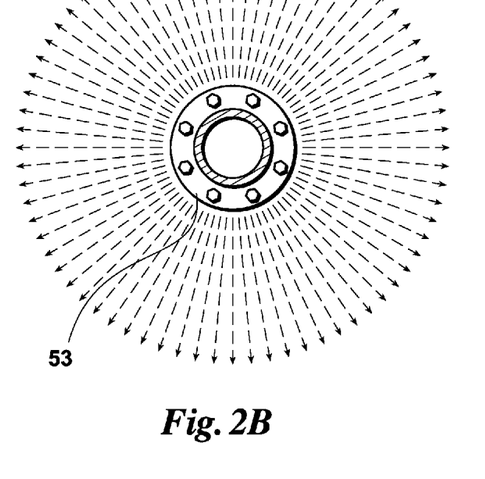
FIG. 2B is an illustration of the gas bubble distribution pattern of the radial eductor.
Figure 2C:
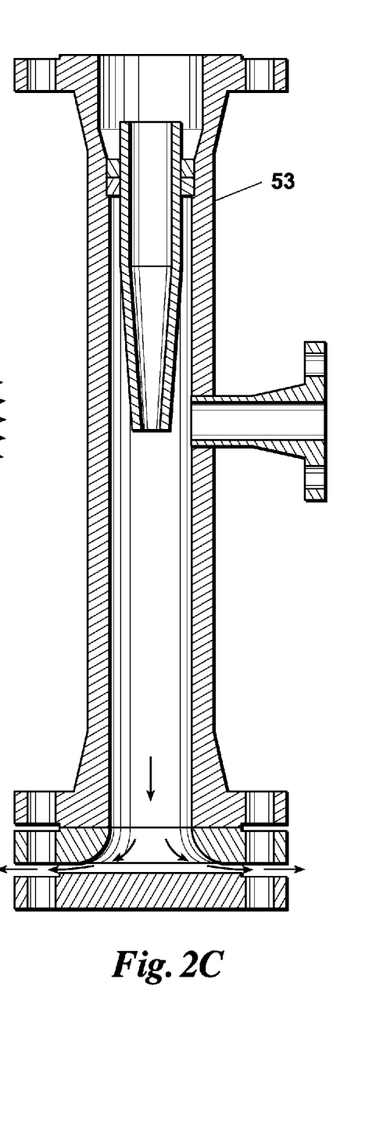
FIG. 2C is a cross-section view of the radial eductor of FIG. 2A.
Figure 8A:
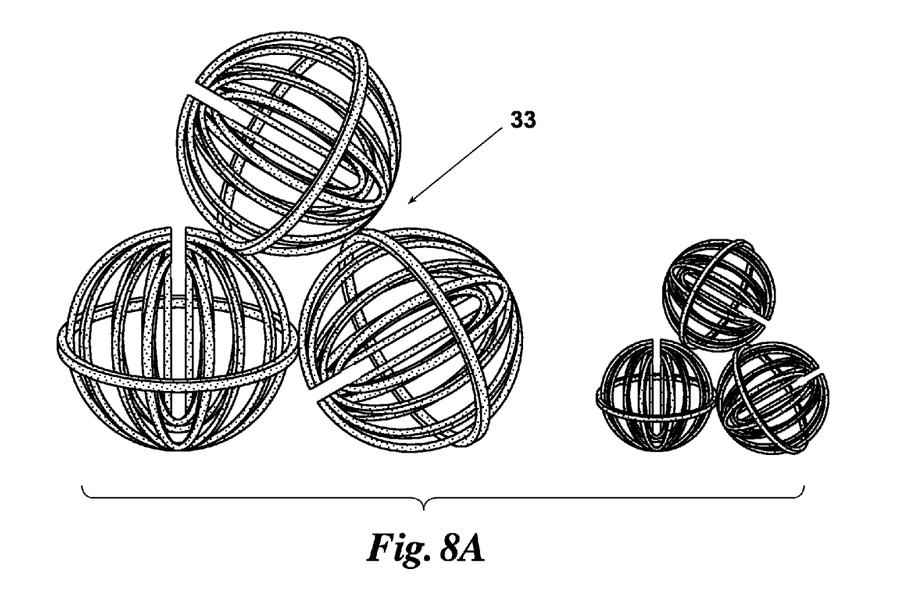
FIG. 8A is an isometric view of a preferred embodiment of the different sized coalescing balls.
Figure 8B:
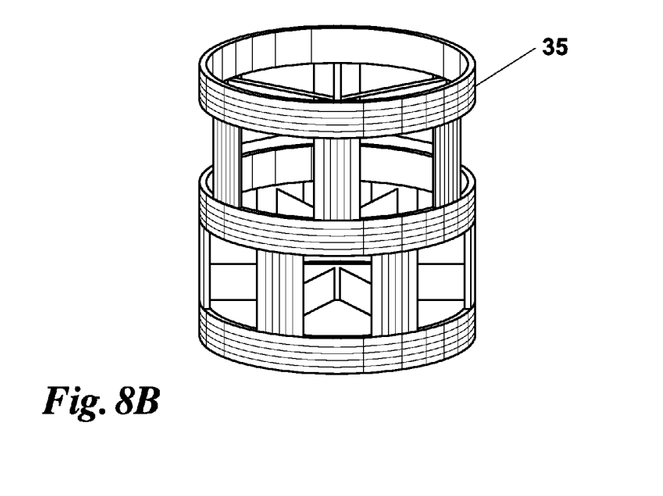
FIG. 8B is an isometric view of a preferred embodiment of a coalescing ring which may be used as an alternative to the coalescing balls.

Referring now to FIGS. 1A, 6 and 8A & B, coalescing section 30 may use different pre-selected sizes, shapes, and materials for the packing. The packing can be coalescing balls 33, coalescing rings 35, or other shapes preferable. The packing can be made of stainless steel or other suitable materials for use in a high service temperature environment. If made of stainless steel or its equivalent, the packing can be cleaned on an as-needed basis with 50 psi steam at 260° F. (344.7 kPa at 126.7° C.).

The packing can also be made of a polymer material which can sustain steam temperatures (e.g., 260° F. or 126.7° C.). The polymer material can be TEFLON® (PFA), TEFZEL® (ETFE), HALLAR™ (ECTFE), KYNAR® (PVDF) material or their equivalent. If chemical cleaning methods are used, the packing can be made of polypropylene having a service temperature of 180° F. (82.2° C.). Steel-coated balls 33 or rings 35 can also be used as packing.

Coalescing section 30 may have a same packing or mix of packing throughout (see e.g. FIGS. 3 and 5A) but is preferably divided into a first and a second section 37, 39, with the first section 37 having a different, pre-selected packing than the second section 39 such as, but not limited to, a larger diameter coalescing ball or ring than the second section 39 (see e.g., FIGS. 1A, 6 and 8A & B). By way of example, first section 37 can use 2-inch (4.08 cm) size coalescing balls 33 followed by second section 39 which uses 1-inch (2.54 cm) size coalescing balls 33. The reason for this arrangement is that the larger diameter coalescing balls have higher open space to handle inlet fluid with high solids concentration and prevent solid plugging, while the smaller diameter coalescing balls provide higher surface coalescing area per unit volume of balls to improve the coalescence of small oil droplets into larger droplets.

The use of different sizes, shapes, and materials for packing, as well as dividing the coalescing section 30 into different sections 37, 39 with different, pre-selected packing, provides options for vessel 10 to be equipped or retrofitted to handle different treatment conditions such as high solid concentration in the inlet stream or inlet streams having different physical properties such as but not limited to interfacial tension.

Figure 7:
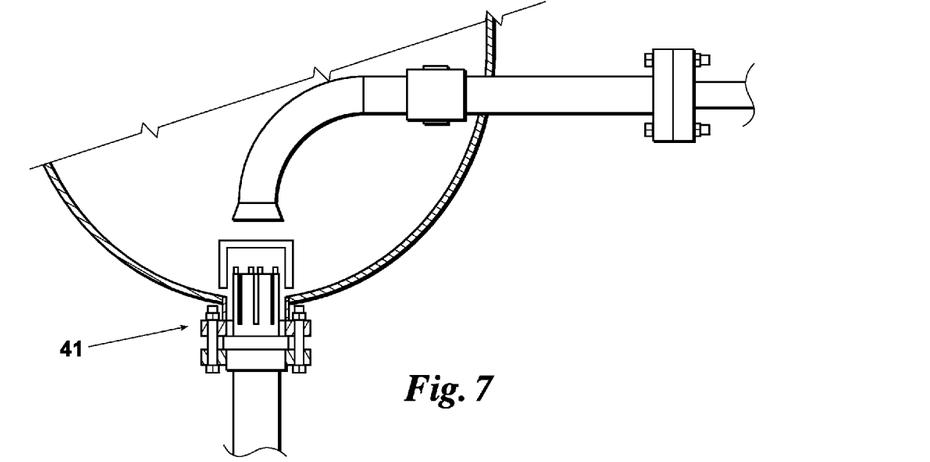
FIG. 7 is a preferred embodiment of a solids removal device suitable for use in the coalescing section of the scrubber.

The solids which settle at the bottom end 17 the vessel 10 may need to be removed on a regular basis. Removal can be done by way of a typical solids removal device 41 such as a HYDROTRANS™ solids fluidization device (Cameron Process Systems, Houston, Tex.) (see e.g. FIG. 7) or its equivalent, or by 50 psi (344.7 kPa) steam or other chemical cleaning methods known in the art. The solids removal device 41 preferably creates a rotary, vertiginous, or cyclonic flow external to the device (i.e., straight in and rotary or cyclonic out) and fluidizes the solids for removal by a slurry line.

Referring now to FIG. 5A, a solid baffle 43 can be used after the coalescing section 30 to divert the fluid exiting the section 30 longitudinally from one end 11 of the vessel 10 to the other end 13 of the vessel 10. The solid baffle 43 can be arranged to provide dual flow (see FIG. 5B) or single flow through the flotation section 50 (see FIG. 5C).

Multiple perforated baffles 55 installed in the flotation section 50 divides the flotation section 50 into multiple cells 57 and help distribute flow uniformly across or through flotation section 50. Preferably, the cross-sectional area per each hole and number of holes in the baffles 31 are designed to have a pressure drop in a range of 0.8 to 1.0 inch (2.032 to 2.54 cm) water column. Gas-inducing devices, preferably one or more radial eductors 53 or their equivalent, can be installed inside each cell 57.

Treated water exits vessel 10 by first entering an outlet water collecting pipe 61 which extends in the longitudinal direction of vessel 10 and has one or more openings along its length, preferably a perforated pipe or a pipe with a slot. The pipe 61 reduces short circuiting of the outlet fluid and prevents oil droplets being dragged into the water outlet stream exiting the treated water outlet pipe 63.

The outlet water collection pipe 61, in combination with the inlet flow distributor 21 and the multiple perforated baffles 31, 55 work to double the volumetric utilization of vessel 10—that is, the total volume of the oil-in-water being treated in the vessel relative to the total volume of the vessel—to greater than 90% from less than 45%. For example, the total volume of a 12-foot diameter by 60-foot long (3.6576 m by 18.288 m) vessel 10 is approximately 50,760 gallons (about 192,147 liters). A utilization of 90% allows the filled volume to be approximately 45,684 gallons (about 172,933 liters). Because of this increased utilization, the length of vessel 10 can be reduced by about 50% compared to prior art vessels and trains yet treat an equal volume of throughput as those prior art vessels and trains. Therefore, vessel 10 is more compact and its construction costs are reduced relative to prior art vessels and trains.

A method of treating an oil-in-water stream includes the step of routing an oil-in-water stream to vessel 10 as described above. The flow rate through vessel 10 can be in the range of 1 ft/min to 10 ft/min (0.3048 m/min to 3.048 m/min), and more preferably in the range of 2 ft/min to 5 ft/min (0.6096 m/min to 1.524 m/min). The optimal flow rate design depends upon the inlet fluid properties, inlet oil droplet size, and the outlet oil-in-water specification.

While preferred embodiments of vessel 10 have been described, the preferred embodiments may not be all possible embodiments of the invention. The scope of the invention is defined by the following claims, including each claim's full range of equivalency.

What is claimed:

1. A vessel for treating an oil-in-water inlet stream, the vessel being elongated in a horizontal longitudinal direction and further comprising within an interior of the vessel:
   an inlet flow distributor connected to an inlet of the vessel and extending left and right of the inlet parallel to the horizontal longitudinal direction of the vessel;
   a coalescing section located downstream of the inlet flow distributor in a horizontal lateral direction of the vessel between a perforated baffle and a second baffle and extending about a same length as the inlet distributor in the horizontal longitudinal direction of the vessel;
   a gas flotation section located downstream of the second baffle in the horizontal lateral direction of the vessel and extending about the same length as the coalescing section in the horizontal longitudinal direction of the vessel; and
   an outlet water collecting pipe arranged to receive a flow exiting the gas flotation section, the outlet water collecting pipe having one or more openings located along its length;
   the inlet flow distributor being arranged to direct an inlet flow to the vessel in the horizontal lateral direction across the vessel, the inlet flow within the vessel remaining a horizontal flow through the coalescing and gas flotation sections.

2. A vessel according to claim 1 further comprising the coalescing section being divided into a first and a second section.

3. A vessel according to claim 2 further comprising the coalescing section including a packing, the packing of the first section being a different packing than the packing of the second section.

4. A vessel according to claim 3 wherein the packing of the first section is a different size than the packing of the second section.

5. A vessel according to claim 3 wherein the packing of the first section is a different material than the packing of the second section.

6. A vessel according to claim 1 wherein the packing is selected from the group consisting of coalescing balls and coalescing rings.

7. A vessel according to claim 1 further comprising a solid baffle arranged after the second baffle, the second baffle being a perforated baffle.

8. A vessel according to claim 1 further comprising the inlet flow distributor arranged to first direct the incoming flow away from the perforated baffle of the coalescing section.

9. A vessel according to claim 8 further comprising the inlet flow distributor including a half-pipe arranged to redirect the incoming flow toward the perforated baffle of the coalescing section.

10. A vessel according to claim 1 further comprising the vessel including a solids removal device.

11. A vessel according to claim 10 wherein the solids removal device creates a cyclonic flow about the solids removal device.

12. A vessel according to claim 1 further comprising the gas flotation section including a gas-inducing device.

13. A vessel according to claim 1 wherein a flow rate through the vessel is in a range of 1 ft/min to 10 ft/min (0.3048 m/min to 3.048 m/min).

14. A vessel according to claim 13 wherein the flow rate is in a range of 2 ft/min to 5 ft/min (0.6096 m/min to 1.524 m/min).

15. A vessel for treating an oil-in-water inlet stream, the vessel extending in a horizontal longitudinal direction and comprising within an interior of the vessel:
an inlet flow distributor arranged parallel to the horizontal longitudinal direction of the vessel to direct an inlet flow across the vessel in a horizontal lateral direction toward a perforated baffle of a coalescing section, the coalescing section being arranged immediately downstream of the inlet flow distributor in the horizontal lateral direction and immediately upstream of a second baffle;
a gas flotation section arranged downstream of the second baffle in the horizontal lateral direction to receive a horizontal flow exiting the coalescing, the gas flotation section being divided by one or more perforated baffles; and
an outlet water collecting pipe arranged to receive a horizontal flow exiting the gas flotation section, the outlet water collecting pipe having one or more openings located along its length.

16. A vessel according to claim 15 further comprising the coalescing section housing a first and a second packing, wherein the first packing and the second different packing are a different size.

17. A vessel according to claim 16 wherein the first packing and the second different packing are a different material.

18. A vessel according to claim 15 further comprising a solid baffle arranged after the second baffle, the second baffle being a perforated baffle.

19. A method of treating an oil-in-water stream the method comprising the step of flowing in a horizontal direction the oil-in-water stream through a vessel, the vessel being elongated in a horizontal longitudinal direction and housing:
an inlet flow distributor extending parallel to the horizontal longitudinal direction of the vessel and arranged to direct an inlet flow to the vessel in a horizontal lateral direction across the vessel and toward a perforated baffle of a coalescing section, the coalescing section being arranged downstream of the inlet flow distributor in a horizontal lateral direction of the vessel and extending in the horizontal longitudinal direction of the vessel and being arranged upstream of a second baffle;
a gas flotation section extending in the horizontal longitudinal direction of the vessel and arranged downstream of the coalescing section in the horizontal lateral direction of the vessel to receive a horizontal flow exiting the coalescing section, the gas flotation section being divided by one or more perforated baffles; and
an outlet water collecting pipe arranged to receive a horizontal flow exiting the gas flotation section, the outlet water collecting pipe having one or more openings located along its length.

20. A method according to claim 19 wherein the coalescing section includes a packing and is divided into a first and a second section, a packing of the first section being a different pre-selected packing than a packing of the second section.

21. A method according to claim 20 wherein the packing of the first and second sections differ in size.

22. A vessel according to claim 1 further comprising the coalescing section including a packing.

* * * * *